United States Patent [19]
Brown et al.

[11] Patent Number: 5,133,211
[45] Date of Patent: Jul. 28, 1992

[54] WHEEL BEARING TEST SYSTEM

[75] Inventors: David L. Brown, Stow; Robert T. Webb, Fairlawn, both of Ohio

[73] Assignee: Aircraft Braking Systems Corporation, Akron, Ohio

[21] Appl. No.: 651,883

[22] Filed: Feb. 7, 1991

[51] Int. Cl.⁵ ............................................ G01M 19/00
[52] U.S. Cl. ................... 73/118.1; 73/862.04
[58] Field of Search ............... 73/118.1, 10, 9, 12, 73/862.04, 146

[56] References Cited
U.S. PATENT DOCUMENTS
4,324,139  4/1982  Muhlau ........................ 73/457

Primary Examiner—Jerry W. Myracle
Attorney, Agent, or Firm—Renner, Kenner, Greive, Bobak, Taylor & Weber

[57] ABSTRACT

A dynamic wheel bearing test system employs a motor and fly wheel interconnected through a drive shaft and clutch or speed control with a wheel portion mounted upon a fixed axle with test bearings interposed therebetween. The drive shaft is received by and rotates within a load reaction block to which are connected hydraulic actuators operating in three orthogonal planes to impart loads to the bearings. A first set of actuators provides radial loads to the bearings, a second provides side loading of the bearings, while a third set of actuators simulates a drag upon the aircraft employing the wheel and bearings under test.

19 Claims, 2 Drawing Sheets

WHEEL BEARING TEST SYSTEM

TECHNICAL FIELD

The invention herein resides in the art of test equipment and, more particularly, to test equipment for bearings. More specifically, the invention relates to a test system replicating an aircraft wheel assembly for testing the wheel bearings of such aircraft during all modes of operation.

BACKGROUND ART

Heretofore it has been well known that aircraft wheel assemblies are subjected to significant static and dynamic forces. While the wheels are static while the aircraft is in the air, immediately upon touchdown, the wheels necessarily spin up to high rotational speeds while being subjected to significant side, radial, and drag forces while the aircraft is maneuvered through its braking and taxiing operations. Accordingly, the wheel bearings for aircraft wheel assemblies must necessarily accommodate such forces and force variations.

Wheel bearing failures have generally not been existent in the past and, accordingly, have not been of great concern. However, recent attention in the aircraft industry to the possibilities of wheel bearing failures have given rise to considerations for testing wheel bearings in a manner to replicate their use in the field.

Presently in the art, only rudimentary attempts have been made to devise aircraft wheel bearing test systems. Such attempts have fallen far short of replicating the wheel assembly of an aircraft and/or the operating environment and characteristics of the associated bearings. One known system is that shown in U.S. Pat. No. 4,862,738. However, in such systems the true environment of the wheel bearings is not replicated, for the test systems fail to generate all of those forces typically applied to an aircraft wheel in operation.

Applicants have found that the true replication of an aircraft wheel assembly during operation requires that the axle assembly be fixed, that the forces to be coupled to the bearing must be imparted to the wheel, not the axle, and that the forces include radial forces, side forces, and the drag forces which result from fore and aft loads on the aircraft itself. Accordingly, to fully synthesize or replicate an aircraft environment, these forces must be available and must be variable to replicate wheel spin up at landing and the characteristic loads and speeds on the wheels during all ground operations.

DISCLOSURE OF INVENTION

In light of the foregoing, it is a first aspect of the invention to provide a wheel bearing test system which fully synthesizes or replicates the aircraft environment and wheel activities during all ground operations.

Another aspect of the invention is to provide a wheel bearing test system in which the axle assembly in the system is fixed.

Still a further aspect of the invention is the provision of a wheel bearing test system in which the loading test forces are imparted to the wheel itself, not the axle.

Still a further aspect of the invention is the provision of a wheel bearing test system in which the forces imparted to the bearing include radial forces, side forces, and drag forces.

Yet an additional aspect of the invention is the provision of a wheel bearing test system which can replicate wheel spin up at landing, as well as the wheel loading and speeds incurred during braking and taxiing.

Still a further aspect of the invention is provision of a wheel bearing test system which is reliable and durable in operation, while being readily conducive to implementation with state of the art devices.

The foregoing and other aspects of the invention which will become apparent herein are achieved by a wheel bearing test system, comprising: an axle; a rotatable member received upon said axle; test bearings interposed between said rotatable member and said axle; drive means for engaging and rotatably driving said rotatable member; and force generating means operatively engaging said rotatable member for imparting to said rotatable member side loads, radial loads, and drag loads.

Yet further aspects of the invention are attained by a test system for wheel bearing, comprising: a fixed axle; a wheel member received and rotatable upon said axle; test bearings interposed between said wheel member and fixed axle; drive means engaging said wheel member for rotating said wheel member upon said fixed axle; and force generating means for receiving said drive means and applying forces to said drive means for loading said test bearings.

DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
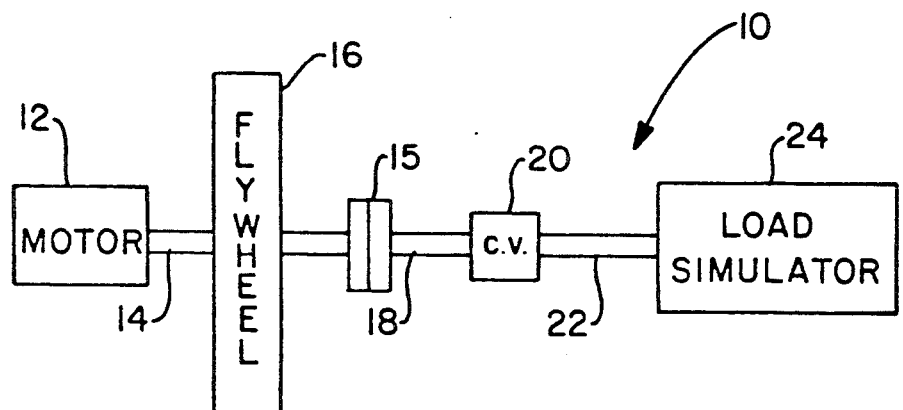
FIG. 1 is a schematic block diagram of the invention.

Referring now to the drawings and more particularly FIG. 1, it can be seen that a wheel bearing test system according to the invention is designated generally by the numeral 10. As shown, a motor 12 is provided as a drive means for the system 10, the motor 12 being a continuously speed controlled motor such that rotational speeds may be controlled during the test operations. A drive linkage 14, such as a shaft, belt, or the like interconnects the motor 12 with an appropriate fly wheel 16 provided for introducing inertia into the test system 10. It will be appreciated by those skilled in the art that the fly wheel 16 may be used for replicating the instantaneous forces applied to the aircraft wheels and bearings at touchdown.

Extending from the fly wheel 16 is a drive shaft 18 which, through an appropriate clutch 15 and coupler 20, interconnects with a drive shaft 22. In a preferred embodiment of the invention, the coupler 20 is a constant velocity (cv) coupler or the like. The drive shaft 22 interconnects with the load simulator 24 of the invention which will be discussed in detail hereinafter.

Figure 3:
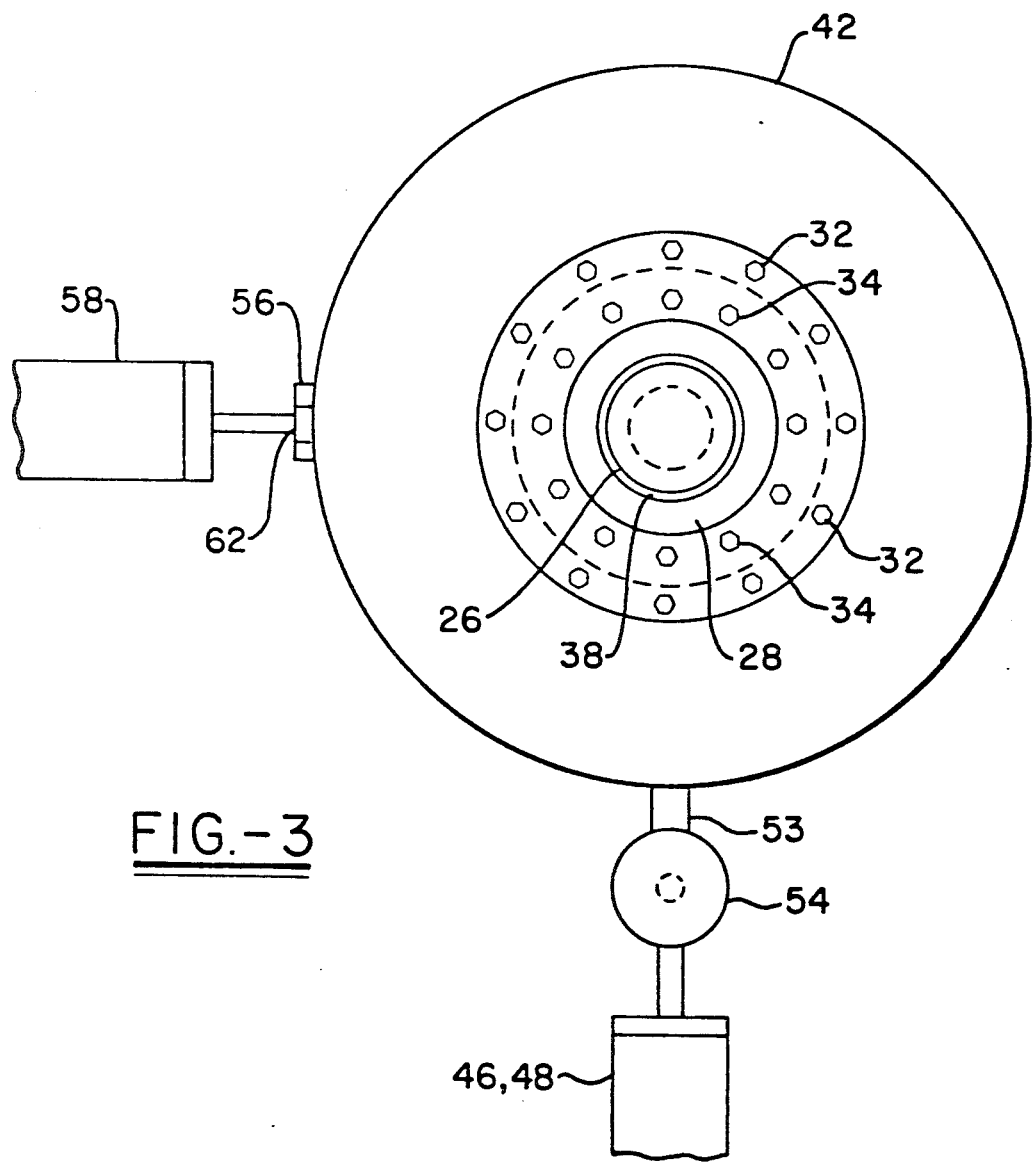
FIG. 3 is an illustrative end view of the load simulator of FIG. 2.
Figure 2:
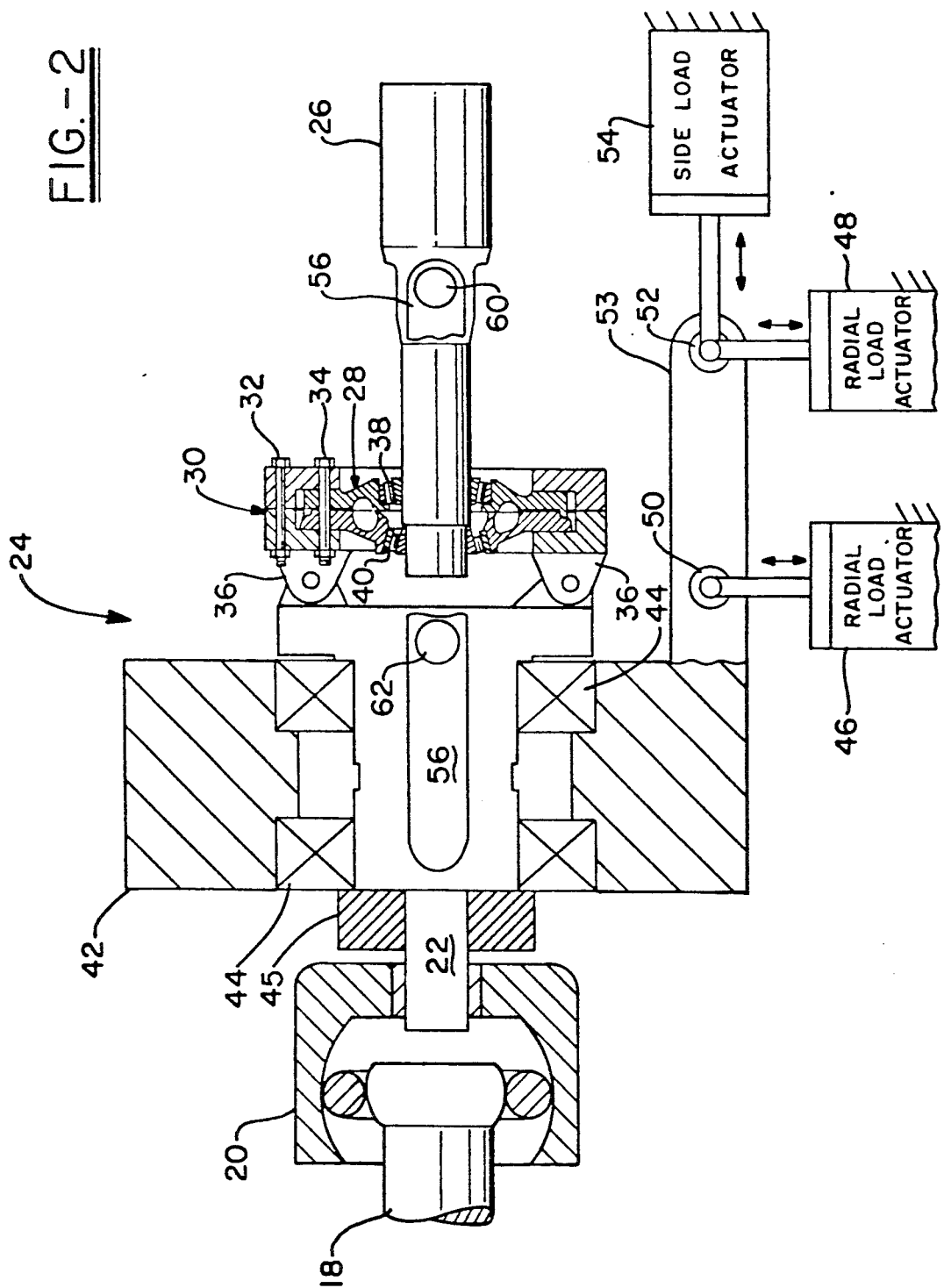
FIG. 2 is an illustrative partial sectional view of the load simulator according to the invention.

With reference now to FIGS. 2 and 3, it can be seen that the load simulator 24 includes a test axle 26 which is a fixed member, replicating the axle of an aircraft. Indeed, in a preferred embodiment of the invention, the test axle 26 can comprise an actual aircraft axle. The inner annular portion of an aircraft wheel assembly 28 is received upon the test axle 26. While an entire wheel could be employed, it is preferred that only the inner annular portion thereof, devised by removing the tube well and flanges, be employed. As is well known to those skilled in the art, such wheels are of the demountable flange type, defined by the mating of complimentary halves.

The wheel portions 28 are secured together by means of an appropriate annular clamp or vice 30, defined by a pair of annular rings joined together as by the array of bolts 32, 34 shown in FIGS. 2 and 3. As illustrated, the outer ring of bolts 32 pass solely through the annular clamp 30, while the inner ring of bolts 34 also pass through the wheel portion 28, assuring both alignment and secured engagement thereof. Extending from the annular clamp 30 is a ring of spaced lugs 36 adapted to interconnect with the drive shaft 22 such that rotation of the drive shaft 22 can be imparted to the wheel portion 28 upon the test axle 26.

Test bearings 38, 40, comprising the aircraft wheel bearings to be tested by the system 10, are received upon the test axle 26 in interposition between the axle 26 and the wheel portion 28. The bearings 38, 40 thereby support rotational motion of the wheel portion 28 upon the axle 26 during the test operation.

To introduce operational forces upon the bearings 38, 40, a load reaction block 42 is provided. The load reaction block 42 is a non-rotating annular member which rotatably receives the drive shaft 22 upon a pair of spaced bearings 44. An appropriate bearing retainer 45 assures retention of the bearings 44 in relationship to the annular load reaction block 42 and drive shaft 22.

To simulate or replicate actual aircraft wheel assembly activity, force loading members are provided in association with the load reaction bar 42 to impart thereto side, radial, and drag both lateral and axial loads which, through the drive shaft 22, are thereby imparted to the wheel portion 28 for appropriate reaction by the test bearings 38, 40. A first such force loading member consists of a pair of radial load actuators 46, 48 which interconnect with a bar or arm 53 connected to and extending from the annular load reaction block 42. As will be appreciated by those skilled in the art, the load actuators 46, 48 comprise pistons, hydraulically or pneumatically actuated, to move the load reaction block 42 radially with respect to the wheel portion 28. To this end, the actuators 46, 48 are parallel to the radial plane of the wheel portion 28. The load actuators 46, 48 are typically actuated together, providing pure radial loading, but it will be appreciated that the actuators 46, 48 may be employed separately, or to varying degrees, to introduce turning moments or yaw effects on the test bearings 38, 40. These forces are communicated from the actuators 46, 48 to the respective points of interconnection 50, 52 upon the bar or arm 53, as shown. In a preferred embodiment, the interconnection points 50, 52 are pivotal or universal type joints.

A side load actuator 54 is also interconnected with the annular load reaction block 42 to drive the block 42 axially with respect to the axis of the axle 26 and wheel portion 28. Again, the side load actuator 54, spaced beneath and parallel to the axle 26, will typically comprise a hydraulic or pneumatic piston. In a preferred embodiment of the invention, the actuator 54 operates coplanar with the actuators 46, 48 and, indeed, may be interconnected to the arm or bar 53 receiving the actuators 46, 48. As shown, the preferred interconnection results in the side load actuator 54 having a force line which intersects the interconnection points 50, 52 upon which the actuators 46, 48 work. Indeed, the actuator 54 is preferably interconnected with the bar 53 at the point 52 shared with the actuator 48. A bar or brace member 56, parallel to the axle 26, is fixedly secured to an outer circumferential surface of the load reaction block 42 as illustratively shown. These three actuators are used to replicate the radial loads, side loads, and moments.

A pair of drag load actuators 58, comprising hydraulic or pneumatic pistons, are appropriately connected to the arm or brace 56 as at pivotal or universal operative points 60, 62. It will be appreciated that the points 60, 62 lie upon a line which is coplanar with the axis of the axle 26. Additionally, the actuators 58 interconnect with the bar 56 in a plane which is orthogonal to the force plane of the actuators 46, 48. In other words, the actuators 46, 48 impart forces in a plane which is normal to the plane of the forces imparted by the actuators 58, such planes preferably intersecting at the central axis of the axle 26.

It will be readily appreciated by those skilled in the art, that the actuators 58 impart an effective drag load to the test bearings 38, 40 through the load reaction block 42. Those skilled in the art will readily appreciate that the radial load actuators 46, 48 impart forces characteristic of the tire-runway interface, while the actuators 58 impart forces characteristic of the drag upon the aircraft as a whole. The side load actuator 54 imparts forces characteristically resulting when movement of the aircraft deviates from straight line motion.

As a feature of the instant invention, the loads to the test bearings 38, 40 are applied, as in actual operation, through the wheel portion 28. With the drive shaft 22 rotatably received within the load reaction block 42 upon the bearings 44, the loads from the actuators 46, 48, 54, 58 are coupled through the drive shaft 22, clamp 30 and wheel portion 28 to the bearings 38, 40. This coupling occurs dynamically, while the drive shaft 22 and wheel portions 28 rotate.

It should now be readily apparent to those skilled in the art that the instant invention provides three planes of force application to the test bearings of an aircraft. In operation, the motor 12 and flywheel 16 may be employed to impart the various rotational speeds and activities which would normally be encountered in an aircraft upon touchdown, braking, and taxiing maneuvers. The load actuators 46, 48, 54, and 58 may then be employed to effect the specific loads upon the test bearings 38, 40 which the same would be expected to withstand for certification and/or use. Of course, it is contemplated that variations of motor speed and actuator activity may be varied throughout the testing procedure. In any event, such speeds and natures of actuation will typically be varied as a function of the aircraft being replicated or simulated.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A dynamic wheel bearing test system, comprising:
an axle;
a rotatable member received upon said axle;

test bearings interposed between said rotatable member and said axle;

drive means for engaging and rotatably driving said rotatable member; and force generating means operatively engaging said rotatable member for imparting to said rotatable member side loads, radial loads, and drag loads.

2. The wheel bearing test system according to claim 1, wherein said axle is fixed.

3. The wheel bearing test system according to claim 2, wherein said drive means comprises a motor and a fly wheel.

4. The wheel bearing test system according to claim 3, wherein said drive means further comprises a constant velocity joint.

5. The wheel bearing test system according to claim 2, wherein said drive means comprises a drive shaft and said force generating means comprises an annular member receiving said drive shaft, said drive shaft being rotatable within said annular member.

6. The wheel bearing test system according to claim 5, wherein said force generating means further comprises first, second, and third load actuators connected to said annular member, said first and second actuators inducing loads on said test bearings through radial forces applied to said annular member, and said third actuator inducing loads on said test bearings through side forces applied to said annular member.

7. The wheel bearing test system according to claim 6, wherein said first and second actuators apply forces lying in respective orthogonal planes intersecting at an axis of said axle.

8. The wheel bearing test system according to claim 7, wherein said third actuator induces a force on said annular member which is parallel to said axis of said axle.

9. The wheel bearing test system according to claim 8, wherein said force of said third actuator is coplanar with said plane receiving said forces of said first actuator.

10. The wheel bearing test system according to claim 5, wherein said rotatable member comprises at least an inner annular portion of a wheel.

11. The wheel bearing test system according to claim 10, wherein said rotatable member further comprises an annular clamp circumferentially engaging said portion of said wheel.

12. A test system for dynamically loading wheel bearings, comprising:

a fixed axle;

a wheel member received and rotatable upon said axle;

test bearings interposed between said wheel member and fixed axle;

drive means engaging said wheel member for rotating said wheel member upon said fixed axle; and force generating means for receiving said drive means and applying forces to said drive means for loading said test bearings, said force generating means comprising first means for radially loading said test bearings, second means for side loading said test bearings, and third means for introducing a drag load onto said test bearings.

13. The test system according to claim 12, wherein said drive means comprises a drive shaft and said force generating means further comprises an annular member, said annular member receiving said drive shaft.

14. The test system according to claim 13, wherein said first and third means introduce forces in planes orthogonal to each other and intersecting at a central axis of said axle.

15. The test system according to claim 14, wherein said second means generates forces lying in a plane receiving forces of said first means.

16. The test system according to claim 15, wherein said drive means further comprises a motor driving a fly wheel, said motor and fly wheel being connected to said drive shaft by a constant velocity coupler.

17. The test system according to claim 12, wherein said wheel member comprises separable wheel flange portions and said drive means comprises an annular clamp circumferentially securing said wheel flange portions.

18. The test system according to claim 17, wherein said drive means comprises a shaft engaging said annular clamp and rotatably received within said force generating means.

19. The test system according to claim 18, wherein said force generating means comprises an annular ring.

* * * * *